Nov. 1, 1955 J. T. NEISWINTER 2,722,682

TWO-WAY SINGLE SIDEBAND RADIO SYSTEM

Filed June 8, 1951 3 Sheets-Sheet 1

INVENTOR
J. T. NEISWINTER
BY H. A. Burgess
ATTORNEY

INVENTOR
J. T. NEISWINTER
BY
H. A. Burgess
ATTORNEY

Nov. 1, 1955 J. T. NEISWINTER 2,722,682

TWO-WAY SINGLE SIDEBAND RADIO SYSTEM

Filed June 8, 1951 3 Sheets-Sheet 3

INVENTOR
J. T. NEISWINTER
BY
H. A. Burgess
ATTORNEY

United States Patent Office 2,722,682

Patented Nov. 1, 1955

2,722,682

TWO-WAY SINGLE SIDEBAND RADIO SYSTEM

James T. Neiswinter, Garden City, N. Y., assignor to American Telephone and Telegraph Company, a corporation of New York Application June 8, 1951, Serial No. 230,561

1 Claim. (Cl. 343—179)

Figure 1:
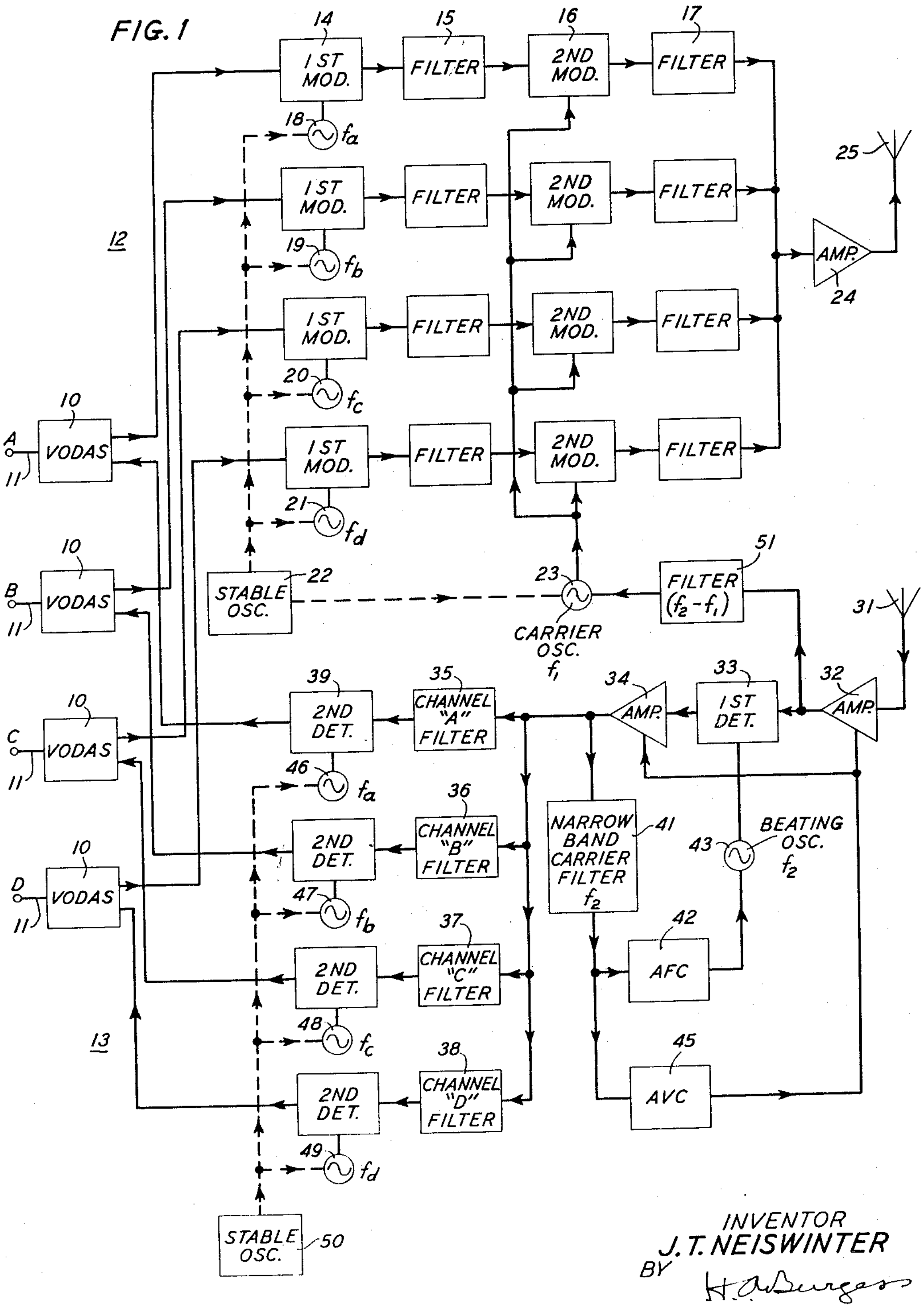

This invention relates to multichannel single sideband radio transmission systems.

A principal object of the invention is to achieve increased utilization of existing frequency assignments.

A more specific object of the invention is the operation of a multichannel single sideband radio system in substantially the same band of frequencies in both directions.

Other objects of the invention relates to economical frequency spacing in a two-way multichannel single sideband radio system.

Single sideband transmission and the economies in power capacity required, frequency spectrum, and energy consumed which it affords are now well known and are described for example in an article entitled "Single sideband short wave system for transatlantic telephony" by F. A. Polkinghorn and N. F. Schlaack appearing in both the Bell System Technical Journal and the Proceedings of the I. R. E. for July 1935. An early use of single sideband transmission was in long wave radio telephone links and particularly transatlantic links. In the case of long wave transmission the low frequency receivers were stable enough to operate without carrier control so that no carrier was transmitted and two-way operation in the same frequency band was a simple matter, requiring only a voice operated device to prevent simultaneous transmission in both directions. As transmission progressed to the higher frequencies it became necessary to transmit a portion of the carrier, usually partially suppressed, for frequency and volume control at the receiver. Two-way single channel operation was still a simple matter, however, since each carrier was transmitted only when the channel was in use in its direction.

Multichannel operation, however, presented a new problem. ("Multichannel" as used herein refers to a plurality of channel sidebands associated with a single carrier in each direction of transmission, the channel sidebands being located about their carrier in a frequency spaced relation.) The east-west carrier should not be turned off when a channel was busy in the west-east direction since this would mean that all of the other channels multiplexed on the common carrier would also have to be idle in the east-west direction. It has, therefore, become the general practice to operate multichannel single sideband systems in different frequency bands to avoid interference between the oppositely directed transmissions and to continuously transmit both carriers during periods of operation.

In accordance with the present invention the number of channels available on existing frequency assignments may be increased by more than fifty per cent by operating a multichannel single sideband system in substantially the same band of frequencies in both directions. In one embodiment, each channel use the same frequency band in both directions, but the carriers for the two directions are separated in frequency by a few hundred cycles depending on expected drift and the amount of attention to be paid the equipment by an operator. The carriers are separated primarily to prevent the automatic frequency control circuits in the receivers from controlling in response to the locally transmitted carrier instead of the received carrier, particularly during fades. The vodas associated with each channel operates on the land line part of the circuit and prevents a particular subscriber from transmitting in a channel sideband while a signal is being received in the same band of frequencies reserved for that sideband.

Figure 2:
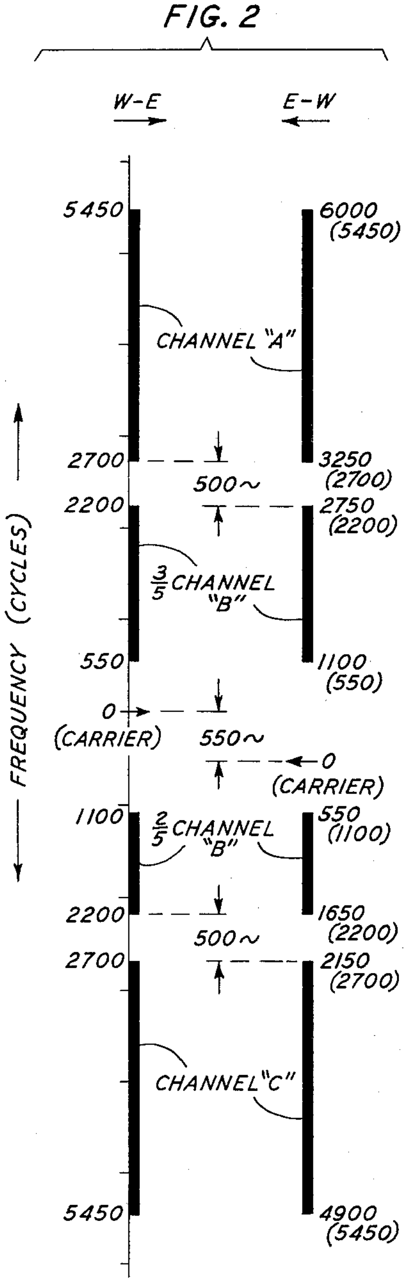
Figure 3:
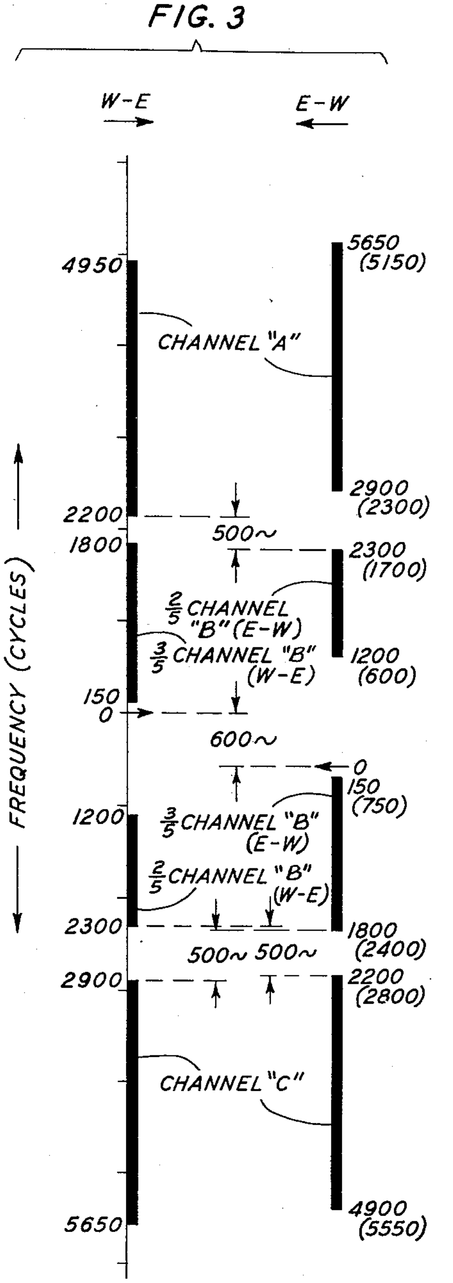
Figure 4:
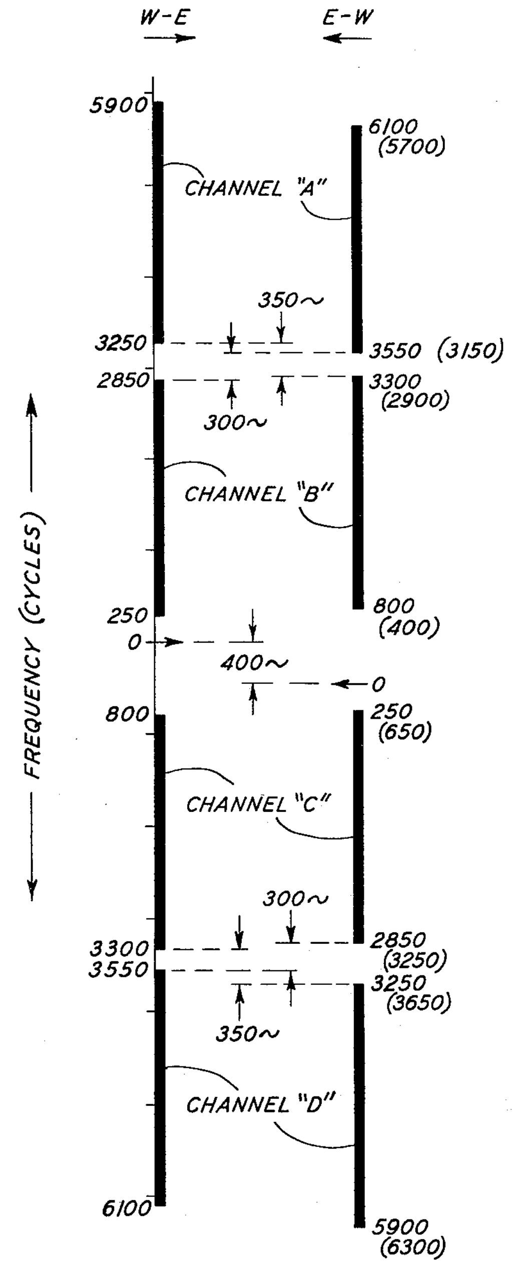

Other objects and features of the invention may be better understood from a consideration of the following detailed description when read in accordance with the attached drawings in which:

Fig. 1 shows by a simplified block schematic diagram, terminal apparatus for a typical single sideband radio system; and Figs. 2, 3, and 4 illustrate frequency spacings in accordance with principles of the present invention.

Referring now to Fig. 1, at the western terminal of a two-way single sideband radio system, the land lines 11 of four subscribers, designated A, B, C, and D are each connected to the terminal transmitter 12 and receiver 13 by way of a vodas 10. Similar apparatus is assumed at the eastern terminal. Each vodas ("voice operated device anti-singing") normally connects the receiver 13 to and disconnects the transmitter 12 from its associated land line. An audio signal coming in from one of the land lines, however, causes a relay operation in the vodas that disconnects the receiver from that land line and places the transmitter in the circuit. A more detailed description of these devices, which are now well known, may be found in two articles appearing in the Bell System Technical Journal, the first entitled "Two-way radio telephone circuits" by S. B. Wright and D. Mitchell, July 1932 and the "Vodas" by S. B. Wright, October 1937.

The transmitter 12 has two stages of modulation for each channel, a first modulator 14 followed by a filter 15 which passes only one of the sidebands resulting from the first modulation process and a second modulator 16 followed by a channel filter 17 which rejects the undesired sideband resulting from the second modulation process. The four oscillators 18 through 21 which drive the first modulator stages for each channel may comprise separate oscillators or may merely be means which derive the desired frequencies, $f_a$, $f_b$, $f_c$ and $f_d$, from a common stable oscillator 22 in any well-known manner, for example, by frequency dividing multivibrators. Likewise, the carrier oscillator 23 which supplies the second modulators with the carrier frequency $f_1$ may be a separate oscillator or may comprise any well-known means which derives the desired frequency from the oscillator 22. The output of each filter 17 comprises the carrier, which may be suppressed to the desired degree by the second modulators 16, and a single sideband. Each sideband will be uniquely located, in frequency relative to the main carrier due to the different intermediate frequencies supplied to the first modulators 14 by the modulating oscillators 18 through 21. The outputs of the filters 17 are combined in the output amplifier 24 and transmitted by the antenna 25 to the eastern terminal. When combined, the outputs of the filters 17 will appear on a frequency scale as shown by way of example in Fig. 4.

The receiver 13 is of the double detection type and has an antenna 31 applying received signals to the receiving amplifier 32 and thence to a common first detector 33 which reduces the signal to an intermediate frequency. The intermediate frequency signals are amplified by an amplifier 34 and the channel sidebands separated by the channel filters 35 through 38 which each pass only the band of frequencies including their intermediate frequency modulated carrier. The original signal is then recovered in each channel by a second detector 39 and applied to the vodas 10 and ultimately to the land line associated with that channel.

Signals from the remote station, which has a transmitter and receiver similar to those illustrated in Fig. 1, are received on a carrier frequency $f_2$, the carrier being supplied by an oscillator corresponding to the oscillator 23 at the local station. A narrow band filter 41 tuned to pass only the intermediate frequencies corresponding to the frequency of the received carrier $f_2$, but having a broad enough pass band to accommodate the expected carrier drift, separates the carrier from the received intermediate frequency signal. The carrier is then applied both to a frequency control circuit 42 for controlling the beating oscillator 43 and to an automatic volume control circuit 45 for controlling the intermediate frequency amplifier 34 and the receiving amplifier 32. The need for accurate frequency control of the receiving oscillator 43 to prevent distortion in single sideband systems and circuits for achieving such control are now well known and will not be herein described. Reference may be made, for example, to the Polkinghorn-Schlaack article previously cited. The demodulating oscillators 46 through 49 may again be separate oscillators or may be means deriving the desired frequencies from a common stable oscillator 50.

When a channel is being used in one direction, it is necessary to transmit the carrier in that direction to control the beating oscillator at the receiver. In a multichannel system this in effect requires that the carrier be continuously transmitted. Depending on the field strength of the local transmitter at the receiver, the receiving antenna 31 may pick up the signal from the local transmitting antenna 25. Further, if the carriers have the same frequency, the automatic frequency control circuit 42 and the automatic volume control circuit 45 may change in control from the receiver carrier of the distant station to the carrier received from the local transmitter, particularly during fades of the received signal. In accordance with the present invention, however, the channels may use the same bands of frequencies in both directions without incurring this trouble by separating the carriers sufficiently so that with expected drift, the locally transmitted carrier will not drift into the pass band of the filter 41 which separates the carrier to be received for frequency and volume control purposes. Even though a channel sideband is picked up and demodulated by the local receiver, it will be prevented by the vodas from reaching the land line associated with the talking subscriber.

The adjacent sidebands of oppositely directed and adjacent channels will also have to be separated by an amount depending on the expected frequency drift. This separation, however, is not as critical as the separation of the carriers since they can be permitted to drift until they reach substantially the same frequency without resulting in more than noise during the overlap.

Since the carriers are separated by only a few hundred cycles each local transmitted carrier will produce an audible note in the local receiver due to beating with the received carrier. This note may be recovered from the receiver by a filter 51 tuned to the difference in frequency between the two carriers, $f_2—f_1$, and applied to the carrier oscillator 23 of the transmitter to maintain the frequency difference constant. The use of such a control will permit a smaller separation of frequency between the carriers since as each one drifts, the other one will follow.

Fig. 2 illustrates a frequency spacing arrangement whereby three two-way channels may be obtained in a 12,000 cycle assignment. Each channel has a 2,750 cycle band with one of the channels, channel B, being divided into two segments, one on either side of the carrier. The carriers are separated by 550 cycles, each carrier being indicated as zero cycles. Each channel utilizes the same frequency band in both directions of operation; the number in parenthesis represents the frequencies of the east-west (E–W) bands referred to the west-east (W–E) scale to illustrate this feature. The adjacent sidebands of oppositely directed channels are separated by 500 cycles as indicated in the drawing. This is somewhat less than the separation of the carriers, but as previously indicated is not as critical. The division of a channel into several segments is a wellknown privacy arrangement and is accomplished by filtering and heterodyning.

Fig. 3 illustrates a somewhat more economical use of the same frequency assignment, obtaining three two-way channels by using only 10,700 cycles of frequency band. The economy is obtained largely by staggering the split portions of channel B, putting in one direction of transmission of 1,650 cycle portion of the channel above the carrier and in the other direction putting it below the carrier. Further, the frequency bands used by channels A and C are not exactly the same in both directions, being 100 cycles higher in the E–W direction. The total frequency band is not only decreased in the arrangement shown in Fig. 4 but a greater separation of the carriers, namely 600 cycles is illustrated.

Fig. 4 illustrates an arrangement whereby four two-way channels may be obtained in an assignment of slightly more than 12,000 cycles. The carrier separation has been reduced to 400 cycles and the sideband separation in some instances to 300 cycles and in others to 350 cycles, but such separations are entirely feasible with present-day equipment.

The arrangement of Fig. 4 involves no channel splitting although the bandwidth of the individual channels is reduced somewhat. This slight reduction in bandwidth is believed warranted by the savings in frequency spectrum in view of the small decrease in quality which may result.

Although the invention has been described with reference to particular apparatus and illustrative frequency spacing arrangements other apparatus and arrangements will readily occur to one skilled in the art so that the invention should not be deemed limited to the apparatus and arrangements specifically described.

What is claimed is:

A two-way multichannel single sideband radio system comprising a first station and a second station physically remote from said first station, transmitting means at each station for transmitting message signals to the other station and receiving means at each station for receiving message signals transmitted by the other station, the transmitting means at said first station comprising means for continuously transmitting a first partially suppressed radio frequency carrier wave susceptible to drift and having a frequency $f_1$ in the absence of drift, means at said second station for continuously transmitting a second radio frequency carrier wave also susceptible to drift whereby said carriers may drift adversely towards each other, said second carrier having a frequency $f_2$ in the absence of drift which differs from $f_1$ by an amount approximately equal to the maximum net adverse drift to which said carriers are susceptible, means at said first station for impressing on said first carrier a first plurality of single sideband message channels in spaced frequency bands located about said first carrier and with the said first carrier located in a frequency interval intermediate an adjacent pair of said frequency bands, means at said second station for impressing on said second carrier a second plurality of single sideband message channels in substantially the same frequency bands as the frequency bands occupied by said first plurality of single sideband message channels and with said second carrier located in a frequency interval intermediate an adjacent pair of the frequency bands occupied by said second plurality of message channels, each of said receiving means comprising a source of beating oscillations of the same frequency as the carrier transmitted by the remote station, means for automatically controlling the frequency of said beating oscillations to follow variations in the frequency of the carrier received from the remote station, said last-named means comprising narrow band filtering means tuned to pass the carrier, with expected drift, received from the remote station and to reject the carrier from the local transmitter and control circuit means for applying the carrier passed by said filtering means to said source of beating oscillations to control the frequency of the same.

References Cited in the file of this patent

UNITED STATES PATENTS

| | | |
|---|---|---|
| 1,361,488 | Osborne | Dec. 7, 1920 |
| 2,284,706 | Wiessner et al. | June 2, 1942 |
| 2,309,678 | Smith | Feb. 2, 1943 |
| 2,388,906 | Corderman | Nov. 13, 1945 |
| 2,481,516 | Jacobsen | Sept. 13, 1949 |
| 2,514,425 | Thompson | July 11, 1950 |
| 2,530,926 | Villem | Nov. 21, 1950 |

FOREIGN PATENTS

| | | |
|---|---|---|
| 111,813 | Australia | Oct. 25, 1940 |

OTHER REFERENCES

Modern Single Sideband Equip-Netherlands Postal Tel and Tel, by Wyc, August 1948.

Single Sideband Appl'd to Radio Link-Netherlands-Neth-East Indies, by Koomans, February 1938.